UNITED STATES PATENT OFFICE.

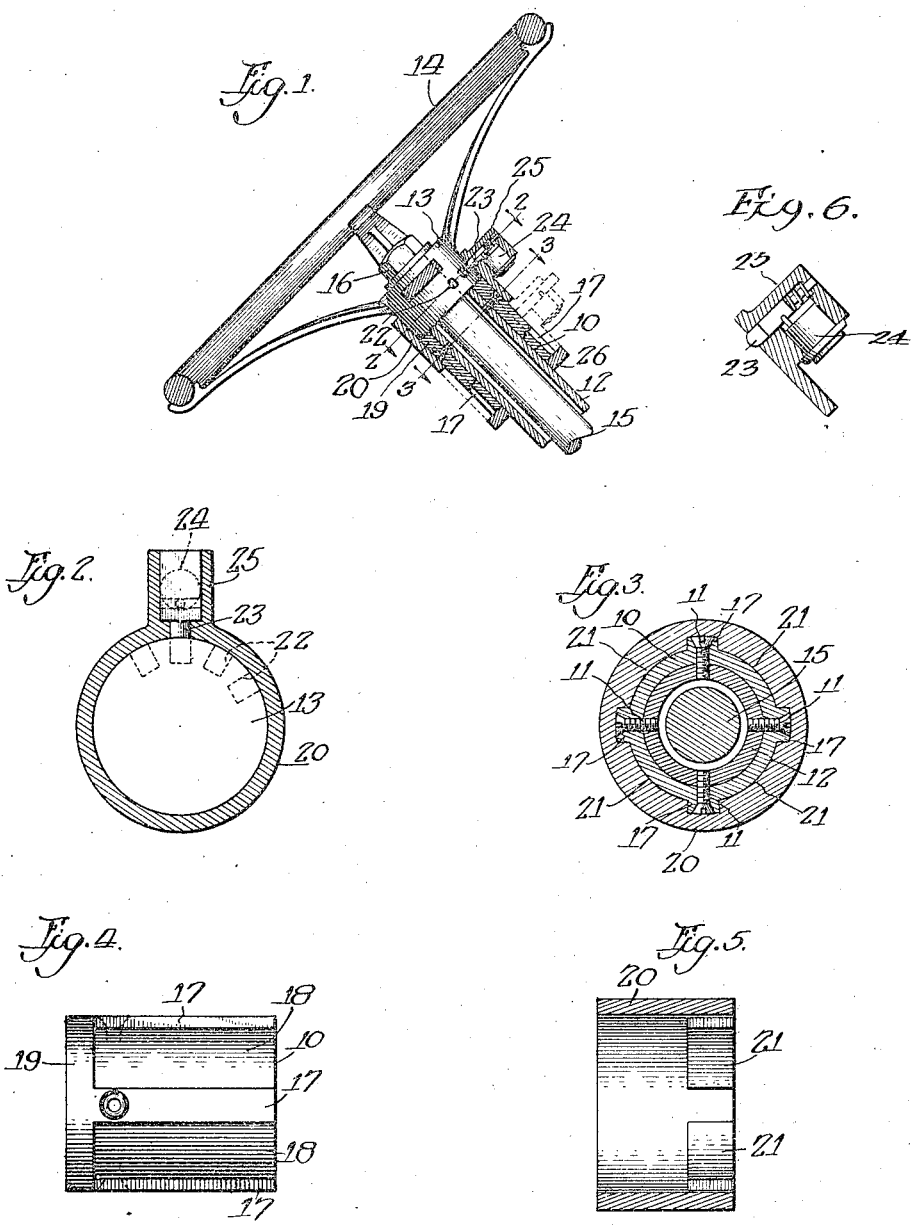

ALLEN C. ALLAN, OF CHICAGO, ILLINOIS, ASSIGNOR OF ONE-HALF TO WILLIAM A. DIFFENBAUGH, OF CHICAGO, ILLINOIS.

AUTOMOBILE-STEERING-WHEEL LOCK.

1,298,853.  Specification of Letters Patent.  Patented Apr. 1, 1919.

Application filed October 6, 1917. Serial No. 195,024.

*To all whom it may concern:*

Be it known that I, ALLEN C. ALLAN, a citizen of the United States, residing at Chicago, in the county of Cook and State of Illinois, have invented certain new and useful Improvements in Automobile-Steering-Wheel Locks, of which the following is a specification.

My invention concerns improvements in devices for preventing theft of automobile and similar appliances or vehicles employing a steering-wheel and associated mechanism. It has been heretofore proposed to lock such steering-apparatus in various ways, but, so far as I know, all of these devices are subject to one or more objections or defects which the present invention avoids.

It is furthermore essential that the locking appliance shall be simple in structure, economical to manufacture, easy to operate, effective in results, and pleasing in appearance. All of these requirements, as well as others, are met in my improved and novel locking device which employs a sliding collar on the stationary steering-column for association with the hub of the steering-wheel when the latter is to be held from turning, thus locking the wheel to its fixed rigid column, and the wheel is also locked by this means against being taken off or removed from its shaft.

In order that those skilled in this art may have a full and complete understanding of the invention and its various advantages, I have illustrated a preferred embodiment of the same in the accompanying drawing, throughout the various views of which like reference characters refer to the same parts.

In this drawing:

Figure 1 is a central longitudinal section through the improved locking mechanism showing it in association with an automobile steering-wheel and its steering post;

Fig. 2 is an enlarged cross-section on line 2—2 of Fig. 1;

Fig. 3 is a similar cross-section on line 3—3 of Fig. 1;

Fig. 4 is an elevation of the sleeve adapted to be fixedly secured to the steering-post;

Fig. 5 is a central section through the sliding collar on which the key-operated locking means is mounted; and Fig. 6 is an enlarged detail section showing the mechanism of the lock.

My improved device includes a sleeve 10 fastened by means of screws 11, 11, or in any other suitable manner, to the upper portion of the stationary, hollow, steering-column 12, such sleeve neatly fitting over the post just beneath the hub 13 of the steering-wheel 14 which, as is customary, is held on the steering-shaft 15, accommodated inside of the column, by the usual cap nut 16. As is clearly illustrated, this supporting sleeve 10 is externally provided with a number of parallel, longitudinal ribs, leaving between them parallel grooves or recesses 18, 18, which, at the upper end of the sleeve are closed or blocked by the circular rib or end wall 19. The device also comprises a collar 20 of an internal diameter substantially the same as the external diameter of the sleeve 10, the collar fitting over the sleeve and being provided with inwardly-extended projections or ribs 21, 21, adapted to snugly fit and slide in the grooves 18, the lugs or ribs 21 being of much less length than the grooves which accommodate them so that the collar may have a substantial sliding movement on the sleeve. Inasmuch as the grooves or cavities 18, 18, do not extend the full length of the sleeve, that is, are blocked at their upper ends by the rib 19, it is impossible to remove the collar upwardly from the sleeve, the ribs 21 striking the companion or retaining rib 19, preventing such separation.

The hub 13 of the steering-wheel is provided with a series or group of radial holes or cavities 22, 22, adapted to receive the end portion of a spring-pressed locking-bolt 23 of an automatically-operated lock 24 mounted in an extension or boss 25 projecting outwardly radially from the upper end portion of the collar 20. This locking-bolt is of such length that when it is not in one of the recesses 22 it projects at its other end outwardly slightly from the part 25, thus giving a visual indication that it is in inoperative position. When the bolt enters one of the recesses 22 its other end is flush with the face of the projection 25, thus indicating or showing that the bolt is in operative locking relation with the hub of the wheel.

At its lower end the sleeve 10 has a flange or ring 26 secured thereto or to the steering-column and adapted to provide an abutment or stop on which the sleeve 20 may rest when in lowered, inoperative position.

The operation of this appliance occurs practically as follows:

When it is desired that the steering-wheel shall be unlocked, that is, fully operative for the steering of the vehicle-wheels, the collar 20 is slid down into the inoperative position shown in dotted lines in Fig. 1, resting, as has been explained on the fixed stop or abutment 26. Assume now that it is required to lock the steering-wheel against turning and also from being taken off of its steering-shaft 15, the operator merely slides the collar 20 upwardly, and the locking bolt 23, being automatic or spring-pressed in its action, is projected into one of the recesses or cavities 22 of the steering-wheel hub, and in this manner the steering-wheel is locked against rotation and held also against upward removal, because the collar cannot turn on the sleeve by reason of the rib and groove connection therewith and the sleeve in turn is fixedly secured to the stationary column by the screws 11. In case one of the holes 22 is not exactly in register or opposite the bolt of the lock when the sleeve is shifted upwardly, it is merely necessary to turn the steering-wheel slightly to bring one of such holes into alinement with the bolt, and the condition of the lock, as to whether it is operative or not, can be readily observed by viewing its other or outer end. If that shows or projects beyond the extension 25, as illustrated in dotted lines in Fig. 1, the lock is not operative; if, however, the end of the bolt is not projected beyond the part 25, but is rather flush with it, as shown in full lines in Fig. 1, the operator knows that the bolt has entered one of the cavities 22 and has locked the steering-wheel in the manner indicated.

It should be observed, furthermore that the screws 11, 11, are so located that they are covered or shielded by the collar 20 when the latter is lifted upwardly into locking engagement with the steering-wheel hub, thus preventing tampering with the appliance and the loosening of the supporting sleeve 10 from the steering-column to which it is fixedly and rigidly secured by these screws.

In the performance of its locking function this device is automatic in its operation so far as the use of any key in the lock 24 is concerned. When, however, it is desired to unlock the steering-wheel the operator inserts a key in the lock 24, and by turning it, withdraws the bolt 23 from the aperture 22 in which it has fitted, thus permitting the collar to be slid down into inoperative position, the inner end of the locking bolt riding on one of the ribs 17, ready for immediate action, as soon as the collar is pushed upwardly again into association with the hub.

Sometimes it is desirable to have the front or steering wheels of a vehicle turned toward the curb so that if the automobile is stopped on a hillside and the brake is unintentionally thrown off, the vehicle will run into the curb, thus preventing possible damage, and it is for this, as well as other reasons, that the steering-wheel hub is provided with a plurality or series of the holes or recesses 22.

It will be clear, therefore, that by this invention I have provided a simple appliance, inexpensive to manufacture, of sightly appearance, and readily operative, to say nothing of the effectiveness of its locking function, preventing the steering-wheel from turning and also eliminating the possibility of the removal of the wheel by the taking off of the top or cap nut 16.

To those skilled in this art many mechanical changes in the appliance presented will suggest themselves and it is to be understood that the invention is not limited or restricted to the precise and exact details of construction shown and described, because these may be varied within wide limits without departure from the heart and substance of the invention and without the sacrifice of any of its substantial benefits and advantages.

I claim:

In an appliance of the character described for the locking of a vehicle steering-wheel to its column, the combination of a stationary steering-column, a steering-wheel associated with said column and equipped with a recessed hub, supporting-means fixedly secured to said column, a member slidable on said supporting-means toward and from said steering-wheel hub but held from turning on said column, coöperating means on said supporting-means and member preventing upward removal of the latter from the former, and a lock on said member having a key-retracted visible bolt spring-pressed toward said hub and adapted to engage the hub recess when brought into register therewith, thus locking the steering-wheel against rotation and also against upward removal from the column, substantially as described.

ALLEN C. ALLAN.